Aug. 29, 1950     N. S. HULSTEIN     2,520,638
FLASH SYNCHRONIZER FOR CAMERAS, INCLUDING
SHUTTER TRIP SAFETY SWITCH
Filed Dec. 1, 1945
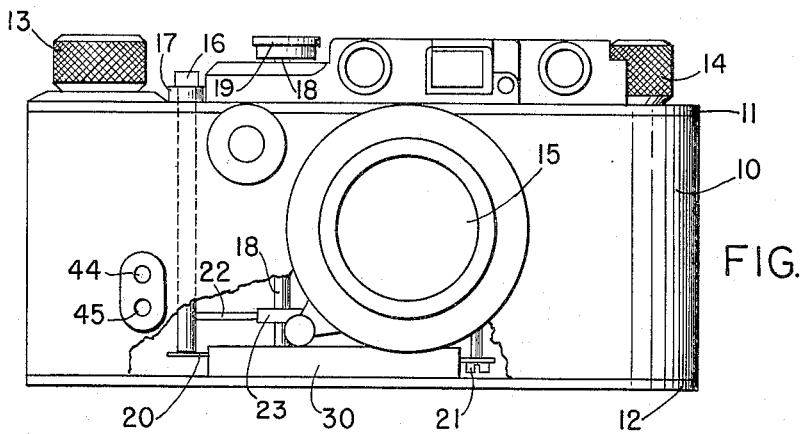
FIG. 1
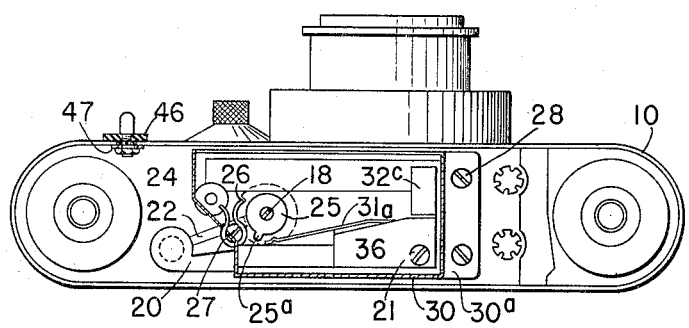
FIG. 2
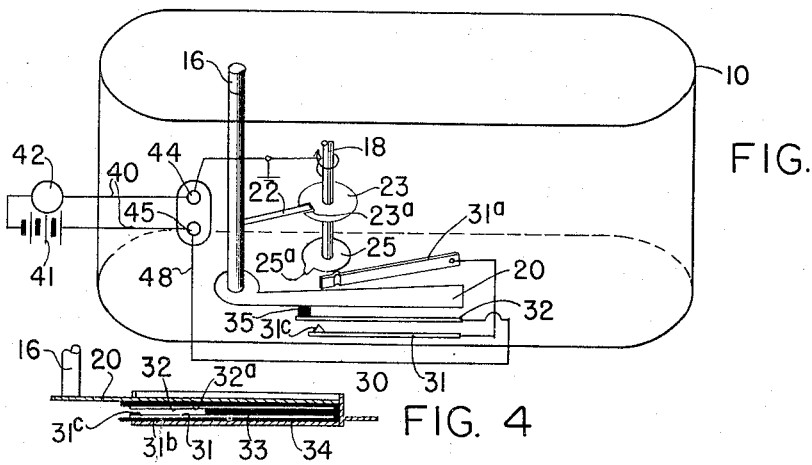
FIG. 3
FIG. 4
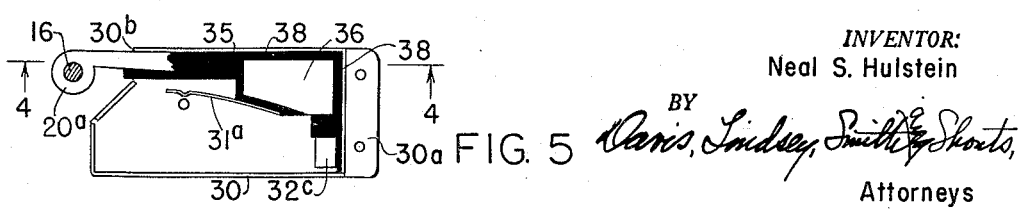
FIG. 5
*INVENTOR:*
Neal S. Hulstein
BY Davis, Lindsey, Smith & Shorts,
Attorneys Patented Aug. 29, 1950

2,520,638

UNITED STATES PATENT OFFICE 2,520,638

FLASH SYNCHRONIZER FOR CAMERAS, INCLUDING SHUTTER TRIP SAFETY SWITCH

Neal S. Hulstein, Denver, Colo., assignor to Heiland Research Corporation, Denver, Colo., a corporation of Colorado Application December 1, 1945, Serial No. 632,186

1 Claim. (Cl. 95—11.5)

This invention relates to improvements in synchronizers for cameras and its purpose is to provide an improved device for automatically synchronizing the operation of a flashlight bulb with the opening of the shutter of a camera.

The principal object of the invention is to provide a camera with a synchronizing device adapted to be actuated by the mechanism by which the shutter of the camera is actuated for causing the energization of a flashlight bulb simultaneously with the arrival of the shutter at its fully open position. A further object is to provide a synchronizing device comprising switching mechanism mounted as a unit and capable of being applied to a camera to be operated by parts which move in response to the actuation of the shutter of the camera for closing the circuit of a flashlight bulb whereby the exposure is made at the instant when the greatest light effect is obtained. Still another object is to provide an auxiliary device capable of being applied to a standard camera without material modification of the camera and capable of being actuated by normal shutter actuating parts of the camera for closing the circuit of a flashlight in synchronism with the opening of the shutter. Another object is to provide a camera with a flashlight circuit comprising two sets of contacts, one of which is adapted to be manually closed by the operation of the operating member which effects the opening of the shutter while the other set is closed thereafter, in proper timed relation to the arrival of the shutter at its fully open position, by the motion of a spring motor actuated part which is set in motion in response to the actuation of said manually operated member. Other objects relate to various features of construction and arrangement which will appear more fully hereinafter.

The nature of the invention will be understood from the following specification taken with the accompanying drawings in which one embodiment is illustrated. In the drawings, Figure 1 shows a side elevation of a camera having the present invention applied thereto with parts thereof broken away;

Fig. 2 shows a bottom plan view of the camera illustrated in Fig. 1 with the bottom plate of the camera removed and with certain parts of the attachment of the present invention illustrated in horizontal section and showing a bottom plan view of others of these parts;

Fig. 3 shows a somewhat diagrammatic perspective view of certain parts of the camera and of the circuit of the flashlight bulb which is actuated by the synchronizing device of the present invention;

Fig. 4 shows a longitudinal section on the line 4—4 of Fig. 5, illustrating the contact device, forming a part of the present invention, which is mounted in the lower part of the camera casing and which is illustrated in Fig. 2; and Fig. 5 shows a top plan view of the contact device illustrated in Figs. 2 and 4 which is capable of being detached from the camera and which is actuated by moving parts of the camera mechanism for controlling the circuit of the flashlight bulb.

The invention may be applied to or employed with various forms of cameras but has been illustrated in the drawings as being applied to a particular type of camera comprising a comparatively flat oblong metallic casing 10 provided with a top plate 11, a removable bottom plate 12, a shutter actuating and film winding shaft operated by a hand wheel 13, another film winding shaft operated by a hand wheel 14, a lens 15, a shutter operating member 16 in the form of a reciprocatory rod movable in a sleeve 17 and a shaft 18 for controlling the speed of the shutter which is set in operation when the shutter operating member 16 is actuated and which is provided with an adjustable wheel 19 for regulating the speed of the shutter. In the operation of the camera, the shutter operating member 16 is pushed downwardly, thus releasing the shutter which is actuated by a spring or the like so that it travels across the lens opening and exposes a section of the film. The speed of this travel is controlled by a roller mounted on the shaft 18 which engages the face of the shutter. After each exposure, the shutter must be restored by the turning of the hand wheel 13 and this operation moves a new section of the film into position opposite the lens. When the shutter operating member 16 is moved downwardly it compresses an elongated leaf spring 20 which is secured on the base of the camera by screws 21 and when this downward movement occurs, an arm 22 projecting laterally from the member 16 is moved out of engagement with a notch 23a formed in a disc 23 which is secured on the shaft 18, thus releasing the spring actuated shaft 18 so that it is free to rotate during the travel of the shutter. After being depressed the arm 22 remains in its lower position and upon release of the shutter operating member 16 after the exposure has been made, the member 16 is restored to its upper position by the leaf spring 20.

At the bottom of the camera the shaft 18 projects through a base plate 24 which is spaced upwardly from the removable bottom plate 12 and this projecting end of the shaft carries a relatively fixed disc 25 having at one point around its periphery a projecting lug 25a which normally occupies the position shown in Fig. 2. When the operating member 16 is depressed and an exposure made, the shaft 18 makes slightly more than one revolution and is brought to rest at a point where the projection 25a engages an arm of the U-shaped spring 26 which is secured to the base plate 24 by a screw 27. When the hand wheel 13 is operated to rewind the shutter and to wind the film, the disc 25 is again rotated in a clockwise direction, as viewed in Fig. 2, thereby restoring the projection 25a to the position shown in Fig. 2. Other features of the camera which do not bear directly upon the present invention are not described.

The synchronizing attachment of the present invention comprises an auxiliary casing 30 which is in the form of a substantially rectangular metal case open on its upper side and provided at one end with a projecting flange 30a which may be attached to the base plate 24, after removing the bottom plate 12, by removing one of the screws 21 and another screw 28 which are a part of the usual camera construction, and then replacing these screws with their shanks inserted through apertures in the flange 30a. The casing 30 is then held securely on the base plate 24 with its side walls extending upwardly into engagement with the base plate and at the end of the casing opposite the flange 30a there is provided an opening 30b adapted to receive the stem of the spring 20 which is held in place by the screws 21 and which occupies a position somewhat below the base plate 24 with its circular end portion 20a engaging the operating member 16.

This auxiliary casing 30 has mounted therein two metal contact plates 31 and 32 which are separated from each other by a sheet of insulating material 33. The bottom contact plate 31 is insulated from the bottom wall of the casing 30 by an insulating sheet 34 and a sheet of insulating material 35 is placed over the upper contact plate 32, being held in place by a metal plate 36 which is secured over a part of this assembly as shown in Fig. 5. All of these plates are insulated from the side walls of the casing by sheets of insulating material 38. One of the contact plates 31 carries a leaf spring 31a which projects into the chamber of the casing 30 in a position to be engaged by the projection 25a of the disc 25 during the rotation of the shaft 18. The upper contact plate 32 has a longitudinally extending flexible arm 32a underlying the spring 20 and adapted to contact at its extremity with a projection 31c formed on a corresponding arm 31b of the lower contact plate 31 when it is moved downwardly by the spring 20 at the time of actuation of the shutter operating member 16. There are thus provided two sets of contacts, one consisting of the contact plates 31 and 32 which are brought into engagement by the actuation of the shutter operating member 16, while the other set consists of the leaf spring 31a and the disc 25 which are brought into engagement by the rotation of the shaft 18.

The electric circuit in which these two sets of contacts are adapted to operate is illustrated somewhat diagrammatically in Fig. 3. The flashlight circuit is illustrated as comprising two electric conductors 40 having connected therein the flashlight battery 41 and the flashlight bulb 42. The conductors 40 may be in the form of flexible conductors provided at their extremities with a terminal socket adapted to be plugged into engagement with the terminal posts 44 and 45 which are mounted in the side wall of the camera casing 10. One of these plugs 44 is grounded on the metallic wall of the camera casing and is thereby connected to the shaft 18 and the disc 25. The other terminal post 45 is insulated from the camera casing by an insulating bushing 46 and a washer 47 and this terminal post is connected by a conductor 48 with the upper contact plate 32 to which the conductor is soldered on the lateral projection 32c of this plate.

In the operation of this device the depression of the shutter operating member 16 sets the shutter in motion and at the same time initiates the rotation of the shaft 18. As the shutter operating member 16 moves downwardly, the spring 20, acting through the intermediate insulating sheet 35, depresses the spring 32 and establishes contact between that spring and the projection 31c of the lower contact plate 31 which carries the leaf spring 31a. Then, as the rotation of the shaft 18 continues, the projection 25a, after completing one revolution, engages the projection on the leaf spring 31a and thus completes the circuit and fires the flashlight bulb at the instant when the shutter reaches its fully open position. In this way, the two sets of contacts are caused to operate successively to actuate the flashlight bulb in synchronism with the arrival of the shutter at its open position. The projection 25a of the disc 25 also engages the contact spring 31a during the operation of resetting the shutter and rewinding the film, but the closing of those contacts does not complete the circuit of the flashlight bulb because the contact plates 31 and 32 are then separated, the shutter operating member 16 having been restored to its upper position by the action of the spring 20. Thus, the flashlight bulb can be fired only when the shutter operating member is depressed and is not actuated during the operation of resetting the shutter.

Although one form of the invention has been shown and described by way of illustration, it will be understood that it may be constructed in various other embodiments which come within the scope of the appended claim.

I claim:

The combination with a camera having a reciprocatory shutter operating member and a second member having rotary movement during movement of the shutter, of an electric circuit including a flashlight bulb, an auxiliary casing attached to the camera, a spring mounted in said casing and projecting therefrom to engage said operating member for returning said operating member to its normal position, a pair of contacts connected in said circuit and mounted in said casing, said contacts being adapted to be closed by said spring when said shutter operating member is operated, a rotary contact included in said circuit and mounted on said second member within said casing, and another contact connected in said circuit within said casing and adapted to be engaged by said rotary contact after a predetermined movement of said second member.

NEAL S. HULSTEIN.

REFERENCES CITED

The following references are of record in the file of this patent:

UNITED STATES PATENTS

| Number | Name | Date |
| --- | --- | --- |
| 2,224,674 | Filsinger | Dec. 10, 1940 |
| 2,284,486 | Hineline | May 25, 1942 |
| 2,291,190 | Schwarz et al. | July 28, 1942 |
| 2,311,440 | Jacobson | Feb. 16, 1943 |
| 2,362,863 | Sprague et al. | Nov. 14, 1944 |

OTHER REFERENCES

British Journal of Photography, July 26, 1940, article by Jenkins on Methods, Money, and the Miniature, page 362.